Patented Sept. 5, 1950

2,521,424

UNITED STATES PATENT OFFICE 2,521,424

FUNGICIDAL COMPOSITION COMPRISING A COPPER ACETYLIDE

Miller W. Swaney, Cranford, N. J., assignor to Standard Oil Development Company, a corporation of Delaware No Drawing. Application May 2, 1946, Serial No. 666,842

3 Claims. (Cl. 167—22)

This invention relates to an improved type agricultural fungicide, and particularly to the use of copper acetylides as fungicidal compositions, alone or in combination with other active fungicidal agents or inert carriers or diluents.

There are many types and species of fungi which are of economic importance in the field of agriculture. Typical of these are the various strains such as *Alternaria solani* and *Phytophthora infestans* which frequently appear in the form of tomato foliage diseases, or *Tilletia tritici* and *Sclerotinia fructiola* which are often encountered in the common wheat smut and brown rot of peaches, respectively. In addition to these fungus-produced responses there are the somewhat different bacterial type wilts typified by the so-called bacterial wilt of peaches and other stone fruit. In addition, among other fungi which are responsible for great agricultural losses may be mentioned the sap stain fungi *Ceratostomella pilifera* and *Graphium rigidum*, and those responsible for the rotting of wood such as *Fomes annosus* and *Lenzites trabea*. Likewise, in the preservation of food fungal rotting is a serious and economically important problem. The stem-end rots of citrus fruits caused by *Phomopsis citri* and *Diplodia natalensis*, the "blue mold" of fruits caused by *Penicillium italicum* and "green mold" caused by *Penicillium digitatum* are but a few which are confronted. Of equal importance is the prevention of the damping off of seeds, for which materials generally referred to as seed disinfectants are used, and the protection of tubers and the like against molding in storage.

Industrially the control of fungi is likewise very important for such applications as the mildew proofing of textiles, molded rubber and plastic goods, leather, grain, cereals, and the like.

In accordance with this invention I have found that copper acetylides are of great value in the control of economically important fungi, such as those described above.

Many substances have been proposed in the literature, and used in practice, for the control of fungi, both agriculturally and industrially. Prominent among these are various sulfur and nitrogen compounds, and heavy metal salts, for example, the organic mercury compounds, and complexes of inorganic or organic nature. Among the heavy metal salts and oxides, etc., copper compounds have long been of great importance as fungicides. However, the impracticability of employing soluble copper compounds as agricultural fungicide sprays and the like is apparent; not alone because of their removal by rainfall but also because of their toxic action on foliage, etc. For these reasons the commonly accepted agricultural "coppers" are wholly of an insoluble nature. By "insoluble" is meant, herein, compounds which for all intents are insoluble in water or the spray medium but which can become solubilized to the proper degree in the presence of fungus cultures to inhibit or destroy same. The oldest and best known of the copper fungicides is Bordeaux mixture, prepared from lime and copper sulfate and consisting of a basic copper sulfate which is insoluble, or substantially insoluble, in water. While Bordeaux mixture is a widely used agricultural fungicide it has certain limitations and cannot be used on some of the easily damaged copper-sensitive plants which sustain "burns" from Bordeaux. Consequently, resort has been made in the agricultural trade to the still more insoluble forms of copper such as cuprous oxide, copper silicate, the copper phosphates, copper-zeolites, and the like. While some of these are, to varying degrees, safer on foliage than is Bordeaux mixture they are nevertheless, without exception, less potent fungicidally than is Bordeaux. Therefore, some of these other forms of insoluble copper represent compromises between fungicidal potency and phytocidal tendencies.

According to the present invention I have found that the water-insoluble copper acetylides such as cuprous acetylide, Cu—C≡C—Cu, are very effective fungicides which are comparable to or better than Bordeaux mixture in potency, and which are very safe to use in contact with living plants without leading to undesirable or harmful responses.

Herein, for convenience, copper acetylides are referred to by their approximate empirical formulae, and in the case of the cuprous acetylides some of their bonds are not completely satisfied. Moreover, it is known that in wet form, some of these may exist with water of hydration (Scheiber, Berichte, vol. 41, pp. 3816–28). However, description of methods of preparation serve to identify the products of this invention.

It is well known that copper acetylides are explosive materials when dry. This is especially true of cuprous acetylide itself, Cu—C≡C—Cu, and may be responsible in part for its neglect as an agricultural material. However I have found that this property does not detract from its use as an agricultural fungicide as will become evident from the following discussion. It has been observed that although dry cuprous acetylide explodes when heated or struck, it resists all attempts to detonate it when wet. Therefore it can be handled as a fungicidal spray without danger. While there would be potential danger arising from allowing residues or sediments of the pure copper acetylides to become dried, this danger can likewise be removed, simply by maintaining the copper acetylide uniformly distributed at all times in the presence of an appreciable excess by weight of an inert carrier or diluent such as an earth, a dispersible clay, bentonite clay. In the presence of about two or more times their weight of these inerts, the copper acetylides are rendered harmless and cannot be exploded by heat, mechanical blows, direct flames, etc.

While this invention is not to be restricted by the specific examples cited herein, its objects will be illustrated by those which follow.

Example I

Forty grams of bentonite clay was dispersed in about 1½ liters of water. To this was then added 10 grams of cuprous chloride, 20 grams of ammonium chloride, and an excess of aqueous ammonia to solubilize the copper. Into this solution was then bubbled gaseous acetylene, $HC\equiv CH$, until the precipitation of red cuprous acetylide, $Cu-C\equiv C-Cu$, was complete. The mixture was then diluted with several volumes of water and filtered. The precipitate was then reslurried in water several times until the removal of soluble salts was complete. It was finally worked into a creamy dispersion in about 1 liter of water. Analysis showed this to contain 0.57% copper (calculated as metallic Cu) by weight. This suspension settled only extremely slowly and was redispersible with ease.

Example II

The suspension of cuprous acetylide of Example I was tested for fungicidal activity using the slide-germination method described by Wellman and McCallan (Contributions of Boyce Thompson Institute, vol. 13, No. 3, pages 171–176 and elsewhere). The fungi used were *Alternaria solani* (Ell. & Mart.) Jones and Grout, and *Sclerotina fructiola* (Wint.) Rehm. The cuprous acetylide was compared in activity with two well-known agricultural fungicides, Bordeaux mixture (freshly prepared) and tribasic copper phosphate. The LD50 dosages (50% lethal dose) for these fungi were determined, as follows:

| | LD50 Dosage Limits (percent as Cu based on medium) | |
|---|---|---|
| | Alt. sol. | Scl. fr. |
| Cuprous acetylide (Ex. I) | 0.005 | 0.0005 |
| Bordeaux Mixture | 0.004 | 0.0004 |
| Tribasic Copper Phosphate | Above 0.3 | Above 0.3 |

It is evident that the copper acetylide was comparable in fungicidal potency to Bordeaux mixture and much more potent than tribasic copper phosphate agricultural fungicide.

Example III

In order to test the effect of copper acetylides on plants, two potted coleus plants were thoroughly sprayed with two dilutions of the cuprous acetylide suspension of Example I, containing cuprous acetylide equivalent to 0.05% and 0.005% respectively, expressed as metallic copper, which is considerably above the strength found capable of controlling the fungi in Example II. The sprayed plants were then placed in a glass cabinet where a high humidity was maintained. After 21 days no signs of foliage injury could be found. Many agricultural copper fungicides in these concentrations would have caused foliage damage within this time period under similar conditions.

Example IV

A suspension of cuprous vinylacetylide, $$Cu-C\equiv C-CH=CH_2$$

was prepared as follows: Ten grams of bentonite clay was dispersed in 500 milliliters of water. Into an equal volume of water was dissolved 5 grams of cuprous chloride, 10 grams of ammonium chloride, and an excess of ammonia (10 grams $NH_3$) required to solubilize the cuprous complex. A trace of hydroxylamine hydrochloride was added to retain the cuprous form of soluble copper. The two solutions were mixed with good agitation. Into this mixture was bubbled gaseous vinylacetylene, $HC\equiv C-CH=CH_2$, until the precipitation of all the copper as orange yellow cuprous vinylacetylide, $CuC\equiv C-CH=CH_2$, was completed. This suspension of cuprous vinylacetylide and bentonite was then thoroughly washed and alternately filtered until all soluble salts had been removed. It was finally worked into a creamy suspension in 1 liter of water which settled but very slowly and which redispersed with mild agitation. Analysis showed this suspension to contain cuprous vinylacetylide to the extent of 0.44% calculated as metallic copper.

Example V

The cuprous vinylacetylide suspension of Example IV was diluted with nine parts of water and the resulting suspension sprayed onto a coleus plant until the latter was thoroughly drenched with the cuprous suspension. It was then placed in a moist chamber in a high humidity atmosphere, known to favor fungus growth as well as foliage "burning" by copper fungicides. At the end of 21 days the sprayed plant was in excellent condition and showed no damage of any kind.

Example VI

A suspension of cupric acetylide was prepared as follows: Ten grams of cupric chloride, $CuCl_2.2H_2O$, was dissolved in 500 milliliters of water to which was added an excess of ammonia. This was then mixed with agitation with a suspension of 25 grams of bentonite in 500 milliliters of water. Into this mixture was bubbled acetylene gas. After an initial induction period a dark precipitate of cupric acetylide began to be formed and the bubbling was continued until this precipitation was complete. The final suspension was purified by washing in the usual manner described above, and when finally obtained in a volume of about 1 liter, analysis showed a copper content of 0.36% copper calculated as the metal.

Example VII

Some of the suspension of Example I was air dried in an oven. It was then partially ground and ten grams of the dried material redispersed by ball-milling into 1 liter of water. Analysis of the final suspension showed 0.07% copper.

Example VIII

The products of Examples IV, VI and VII were tested for fungicidal activity against *Al-*

*ternaria solani* and *Sclerotinia fructiola* as described in Example II. Compared with standard Bordeaux mixture their LD50 dosages were as follows:

| Copper Acetylide of— | LD50 Limits (per cent Cu based on medium) | |
| --- | --- | --- |
| | *Alt. sol.* | *Scl. fr.* |
| Example IV | 0.044 | 0.0044 |
| Example VI | 0.0036 | 0.00036 |
| Example VII | 0.007 | 0.0007 |
| Bordeau mixture | 0.004 | 0.0004 |

The foregoing examples are merely illustrative of the workings of this invention and in no way restrict or limit its applicability. In applying this invention a single copper acetylide may be employed, for example, cuprous acetylide or cupric acetylide, pure or admixed with an inert carrier, or a mixture of acetylides may be utilized, for example, mixed cuprous and cupric acetylides. Further, the acetylenes of different molecular weight may be employed as their copper acetylides, for example, the mixed copper acetylides of acetylene, methylacetylene, alpha-ethylacetylene, vinylacetylene; and copper acetylides of these and other alpha acetylenes of still higher molecular weight, both aliphatic and aromatic, may also be used in mixtures or separately. Also a highly cracked hydrocarbon cut containing acetylenes may be employed. Moreover, the active copper acetylides may be produced in several ways without departing from the scope of this invention. For instance, the copper acetylides may be prepared in advance by the methods employed in the above examples. Or, they may be prepared on the site just prior to their use in agricultural sprays. Or further, they may be prepared by mixing solid calcium carbide with an appropriate aqueous solution of the copper salt, in which case the prepared fungicidal composition may consist of a mixture of copper acetylide and the basic copper chloride or sulfate, as the case may be. Still further, the copper acetylide composition, in some desirable cases, may be mixed with pre-formed Bordeaux mixture and the like and used in special cases. Moreover, for the treating of wood, fibers, etc. for protection against fungi, the article may first be impregnated with a copper solution and subsequently subjected to a solution or atmosphere of an acetylene until the formation of the copper acetylide in situ is effected. There are numerous other ways in which advantage may be taken of this invention without departing from its scope. The copper acetylides may also be used in conjunction with insecticidal compositions, as well as in admixture with paints or coating compositions. They may also be used for the purpose of seed disinfection in any desirable manner.

I claim:

1. A fungicidal composition consisting of a copper acetylide as the active ingredient and an inert clay carrier therefor, said inert carrier being in the weight ratio of at least 2 to 1 to said copper acetylide.

2. A fungicidal composition as in claim 1 in which the acetylide is cupric acetylide.

3. A fungicidal composition as in claim 2 in which the carrier is bentonite.

MILLER W. SWANEY.

REFERENCES CITED

The following references are of record in the file of this patent:

UNITED STATES PATENTS

| Number | Name | Date |
| --- | --- | --- |
| 1,544,197 | Terry | June 30, 1925 |
| 2,111,050 | Magill | Mar. 15, 1938 |
| 2,264,212 | Large | Nov. 25, 1941 |
| 2,337,466 | Herbert | Dec. 21, 1943 |
| 2,370,809 | Morrell et al. | Mar. 6, 1945 |
| 2,399,882 | Morrell et al. | May 7, 1946 |

OTHER REFERENCES

Phillips, "Zeit. Anorg. Chem.," vol. 6, page 241 (1894).

Martin, "Scientific Principles of Plant Protection," 2nd ed., 1936, Arnold and Co., London, pages 124, 154.